United States Patent
Massey et al.

(10) Patent No.: US 9,113,654 B2
(45) Date of Patent: *Aug. 25, 2015

(54) BEVERAGE CONCENTRATES (71) Applicant: Kraft Foods R & D, Inc., Deerfield, IL (US)

(72) Inventors: Adrian Harold Massey, Banbury (GB); Ayse Tulay Massey, Banbury (GB); Clemence Michaut, Banbury (GB); Helen Blangy, Poitiers (FR)

(73) Assignee: Kraft Foods R & D, Inc., Deerfield, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/777,659

(22) Filed: Feb. 26, 2013

(65) Prior Publication Data
US 2013/0196036 A1 Aug. 1, 2013

Related U.S. Application Data (62) Division of application No. 12/748,171, filed on Mar. 26, 2010.

(30) Foreign Application Priority Data

Mar. 27, 2009 (EP) .................................... 09250901

(51) Int. Cl.
- A23L 2/52 (2006.01)
- A23F 3/16 (2006.01)
(Continued)

(52) U.S. Cl.
CPC . *A23L 2/52* (2013.01); *A23F 3/163* (2013.01); *A23F 5/243* (2013.01); *A23L 1/0532* (2013.01); *A23L 1/0534* (2013.01); *B65D 85/8043* (2013.01); *A23V 2002/00* (2013.01)

(58) Field of Classification Search
USPC .................................................... 99/295, 275
See application file for complete search history.

(56) References Cited

U.S. PATENT DOCUMENTS

| 324,049 A | 8/1885 | Thew |
| 1,230,091 A | 6/1917 | Kitchen |

(Continued)

FOREIGN PATENT DOCUMENTS

| CN | 1922097 A | 2/2007 |
| EP | 0 057 671 A2 | 8/1982 |

(Continued)

OTHER PUBLICATIONS

European Patent Office Search Report for European Application EP 04 25 0357.3 dated May 11, 2004, 3 pages.

(Continued)

*Primary Examiner* — Humera Sheikh
*Assistant Examiner* — Tamra L Dicus
(74) *Attorney, Agent, or Firm* — Fitch, Even, Tabin & Flannery LLP (57) ABSTRACT

The present invention provides a cartridge for a beverage preparation system, the cartridge comprising an inlet for the introduction of an aqueous medium into the cartridge, an outlet downstream of the inlet for the discharge of a beverage from the cartridge and a flow path connecting the inlet to the outlet, wherein the flow path includes within it a non-gelled beverage liquid concentrate containing about 0.01 to about 5 weight % in total of one or more thickeners. The cartridge may comprise an aperture having a cross-sectional area of 2 mm² or less downstream of a chamber in which the beverage liquid concentrate is loaded. The beverage concentrate may comprise methyl cellulose and at least one alginate in a weight ratio of 1:5 to 5:1 to provide improved the organoleptic properties such as mouthfeel.

16 Claims, 3 Drawing Sheets

(51) Int. Cl.
  *A23F 5/24* (2006.01)
  *A23L 1/0532* (2006.01)
  *A23L 1/0534* (2006.01)
  *B65D 85/804* (2006.01)

(56) References Cited

U.S. PATENT DOCUMENTS

| | | | |
|---|---|---|---|
| 1,311,844 A | 7/1919 | Wood | |
| 1,576,735 A | 3/1926 | Fessenden | |
| 1,887,905 A | 11/1932 | Schweigart | |
| 2,405,861 A | 8/1946 | Tod | |
| 2,589,801 A | 3/1952 | Grindrod | |
| 2,778,739 A | 1/1957 | Rodth | |
| 3,083,101 A | 3/1963 | Noury | |
| 3,292,527 A | 12/1966 | Stasse | |
| 3,336,857 A | 8/1967 | Knodt et al. | |
| 3,607,297 A | 9/1971 | Fasano | |
| 3,790,029 A | 2/1974 | Ward | |
| 3,821,420 A | 6/1974 | Whelan | |
| 3,823,656 A | 7/1974 | Veken | |
| 3,833,740 A | 9/1974 | Schmidt | |
| 4,253,385 A | 3/1981 | Illy | |
| 4,334,640 A | 6/1982 | van Overbruggen et al. | |
| 4,382,402 A | 5/1983 | Alvarez | |
| 4,471,689 A | 9/1984 | Piana | |
| 4,738,378 A | 4/1988 | Oakley et al. | |
| 4,775,048 A | 10/1988 | Baecchi et al. | |
| 4,806,375 A | 2/1989 | Favre | |
| 4,818,544 A | 4/1989 | Seward | |
| 4,853,234 A | 8/1989 | Bentley et al. | |
| 4,867,993 A | 9/1989 | Nordskog | |
| 4,873,915 A | 10/1989 | Newman et al. | |
| 4,875,408 A | 10/1989 | McGee | |
| 4,886,674 A | 12/1989 | Seward et al. | |
| 4,920,870 A | 5/1990 | Newman et al. | |
| 4,921,712 A | 5/1990 | Malmquist | |
| 4,925,683 A | 5/1990 | Fischbach et al. | |
| 4,990,352 A | 2/1991 | Newman et al. | |
| 5,005,759 A | 4/1991 | Bouche | |
| 5,082,676 A | 1/1992 | Love et al. | |
| 5,197,374 A | 3/1993 | Fond | |
| 5,242,702 A | 9/1993 | Fond | |
| 5,272,960 A | 12/1993 | Kinna | |
| 5,325,765 A | 7/1994 | Sylvan et al. | |
| 5,343,799 A | 9/1994 | Fond | |
| 5,347,916 A | 9/1994 | Fond et al. | |
| 5,398,595 A | 3/1995 | Fond et al. | |
| 5,398,596 A | 3/1995 | Fond | |
| 5,472,719 A | 12/1995 | Favre | |
| 5,531,152 A | 7/1996 | Gardosi | |
| 5,531,604 A | 7/1996 | Huang | |
| 5,603,254 A | 2/1997 | Fond et al. | |
| 5,637,335 A | 6/1997 | Fond et al. | |
| 5,638,740 A | 6/1997 | Cai | |
| 5,638,741 A | 6/1997 | Cisaria | |
| 5,649,412 A | 7/1997 | Binacchi | |
| 5,649,472 A | 7/1997 | Fond et al. | |
| 5,762,987 A | 6/1998 | Fond et al. | |
| 5,773,056 A | 6/1998 | Hohenthal et al. | |
| 5,776,527 A | 7/1998 | Blanc | |
| 5,794,519 A | 8/1998 | Fischer | |
| 5,826,492 A | 10/1998 | Fond et al. | |
| 5,840,189 A | 11/1998 | Sylvan et al. | |
| 5,882,717 A * | 3/1999 | Panesar et al. | 426/595 |
| 5,895,672 A | 4/1999 | Cooper | |
| 5,897,899 A | 4/1999 | Fond | |
| 5,948,455 A | 9/1999 | Schaeffer et al. | |
| 5,974,950 A | 11/1999 | King | |
| 6,021,705 A | 2/2000 | Dijs | |
| 6,025,000 A | 2/2000 | Fond et al. | |
| 6,062,127 A | 5/2000 | Klosinski | |
| 6,068,871 A | 5/2000 | Fond et al. | |
| 6,117,471 A | 9/2000 | King | |
| 6,139,896 A | 10/2000 | Daenzer-Alloncle et al. | |
| 6,142,063 A | 11/2000 | Beaulieu et al. | |
| 6,182,554 B1 | 2/2001 | Beaulieu et al. | |
| 6,186,051 B1 | 2/2001 | Aarts | |
| 6,240,832 B1 | 6/2001 | Schmed et al. | |
| 6,245,371 B1 | 6/2001 | Gutwein et al. | |
| 6,289,948 B1 | 9/2001 | Jeannin et al. | |
| 6,347,725 B1 | 2/2002 | Yoakim et al. | |
| 6,350,484 B1 | 2/2002 | Ault | |
| 6,358,545 B1 | 3/2002 | Chandler et al. | |
| 6,468,576 B1 | 10/2002 | Sher et al. | |
| 6,606,938 B2 | 8/2003 | Taylor | |
| 6,607,762 B2 | 8/2003 | Lazaris et al. | |
| 6,644,173 B2 | 11/2003 | Lazaris et al. | |
| 6,645,537 B2 | 11/2003 | Sweeney et al. | |
| 6,658,989 B2 | 12/2003 | Sweeney et al. | |
| 6,698,333 B2 | 3/2004 | Halliday et al. | |
| 6,740,345 B2 | 5/2004 | Cai | |
| 6,758,130 B2 | 7/2004 | Sargent et al. | |
| 6,810,788 B2 * | 11/2004 | Hale | 99/295 |
| 6,832,542 B2 | 12/2004 | Hu et al. | |
| 6,849,285 B2 | 2/2005 | Masek et al. | |
| 6,941,855 B2 | 9/2005 | Denisart et al. | |
| 7,097,074 B2 | 8/2006 | Halliday et al. | |
| 7,213,506 B2 | 5/2007 | Halliday et al. | |
| 7,219,598 B2 | 5/2007 | Halliday et al. | |
| 7,231,869 B2 | 6/2007 | Halliday et al. | |
| 7,243,598 B2 | 7/2007 | Halliday et al. | |
| 7,255,039 B2 | 8/2007 | Halliday et al. | |
| 7,287,461 B2 | 10/2007 | Halliday et al. | |
| 7,308,851 B2 | 12/2007 | Halliday | |
| 7,316,178 B2 | 1/2008 | Halliday et al. | |
| 7,322,277 B2 | 1/2008 | Halliday et al. | |
| 7,325,479 B2 | 2/2008 | Laigneau et al. | |
| 7,328,651 B2 | 2/2008 | Halliday et al. | |
| 7,335,387 B2 | 2/2008 | Hayes et al. | |
| 7,340,990 B2 | 3/2008 | Halliday et al. | |
| 7,418,899 B2 | 9/2008 | Halliday et al. | |
| 7,444,925 B2 | 11/2008 | Mahlich | |
| 7,533,603 B2 | 5/2009 | Halliday et al. | |
| 7,533,604 B2 | 5/2009 | Halliday et al. | |
| 7,592,027 B2 | 9/2009 | Halliday et al. | |
| 7,607,385 B2 | 10/2009 | Halliday et al. | |
| 7,658,212 B2 | 2/2010 | Meuleners et al. | |
| 2001/0019735 A1 | 9/2001 | Cirkel-Egner et al. | |
| 2001/0026825 A1 | 10/2001 | Reaves | |
| 2001/0048957 A1 | 12/2001 | Lazaris et al. | |
| 2002/0002913 A1 | 1/2002 | Mariller et al. | |
| 2002/0015768 A1 | 2/2002 | Masek et al. | |
| 2002/0023543 A1 | 2/2002 | Schmed | |
| 2002/0048621 A1 | 4/2002 | Boyd et al. | |
| 2002/0078831 A1 | 6/2002 | Cai | |
| 2002/0088807 A1 | 7/2002 | Perkovic et al. | |
| 2002/0129712 A1 | 9/2002 | Westbrook et al. | |
| 2002/0144603 A1 | 10/2002 | Taylor | |
| 2002/0144604 A1 | 10/2002 | Winkler et al. | |
| 2002/0148356 A1 | 10/2002 | Lazaris et al. | |
| 2003/0005826 A1 | 1/2003 | Sargent et al. | |
| 2003/0033938 A1 * | 2/2003 | Halliday et al. | 99/275 |
| 2003/0039731 A1 | 2/2003 | Dalton et al. | |
| 2003/0066431 A1 | 4/2003 | Fanzutti et al. | |
| 2003/0145736 A1 | 8/2003 | Green | |
| 2003/0180431 A1 | 9/2003 | Young | |
| 2003/0222089 A1 | 12/2003 | Hale | |
| 2004/0182250 A1 | 9/2004 | Halliday et al. | |
| 2004/0228955 A1 | 11/2004 | Denisart et al. | |
| 2004/0237793 A1 | 12/2004 | Zurcher et al. | |
| 2006/0093720 A1 | 5/2006 | EdTatz | |
| 2007/0175334 A1 | 8/2007 | Halliday et al. | |
| 2007/0231443 A1 | 10/2007 | Goto | |
| 2008/0014315 A1 | 1/2008 | DeLease | |
| 2008/0138490 A1 | 6/2008 | Nash | |
| 2009/0041911 A1 | 2/2009 | Gamay | |
| 2009/0311384 A1 | 12/2009 | MacMahon | |

(56) References Cited

U.S. PATENT DOCUMENTS

| | | | | |
|---|---|---|---|---|
| 2010/0055207 A1* | 3/2010 | Holahan | ........................ | 424/722 |
| 2010/0247714 A1 | 9/2010 | Massey | | |
| 2010/0288131 A1* | 11/2010 | Kilber et al. | ...................... | 99/295 |

FOREIGN PATENT DOCUMENTS

| | | |
|---|---|---|
| EP | 0 272 922 A2 | 6/1988 |
| EP | 0 324 072 A1 | 7/1989 |
| EP | 0 334 571 A1 | 9/1989 |
| EP | 0 334 572 A1 | 9/1989 |
| EP | 0 162 417 B1 | 3/1990 |
| EP | 0 449 533 A1 | 10/1991 |
| EP | 0 451 980 A2 | 10/1991 |
| EP | 0 455 337 A1 | 11/1991 |
| EP | 0 521 510 A1 | 1/1993 |
| EP | 0 524 464 A1 | 1/1993 |
| EP | 0 638 486 A1 | 2/1995 |
| EP | 0 604 615 B1 | 9/1998 |
| EP | 0 870 457 A1 | 10/1998 |
| EP | 0 904 718 A1 | 3/1999 |
| EP | 0 756 844 B1 | 5/1999 |
| EP | 1 042 978 A1 | 10/2000 |
| EP | 1 090 574 A1 | 4/2001 |
| EP | 1 101 430 A1 | 5/2001 |
| EP | 0 878 158 B1 | 3/2002 |
| EP | 1 440 903 A1 | 7/2004 |
| EP | 1440910 | 7/2004 |
| EP | 1 541 070 B1 | 11/2006 |
| EP | 1 795 074 A1 | 6/2007 |
| EP | 1 367 924 B1 | 7/2007 |
| FR | 1537031 A | 8/1968 |
| FR | 2 322 796 A | 4/1977 |
| GB | 1170868 | 11/1969 |
| GB | 1 215 840 A | 12/1970 |
| GB | 2 306 432 A | 5/1997 |
| GB | 2 374 795 A | 10/2002 |
| GB | 2 374 816 A | 10/2002 |
| GB | 2 374 856 A | 10/2002 |
| GB | 2 379 624 A | 3/2003 |
| JP | 63-092317 A | 4/1988 |
| JP | 04-236921 A | 8/1992 |
| JP | H07500251 | 1/1995 |
| JP | 2000-093309 A | 4/2000 |
| JP | 2001-061663 A | 3/2001 |
| JP | 20065010955 | 1/2006 |
| JP | 2006516907 | 7/2006 |
| JP | 2006516995 | 7/2006 |
| JP | 2006519630 | 8/2006 |
| JP | 200633803 | 12/2006 |
| JP | 2007151545 | 6/2007 |
| NL | 1020835 C2 | 12/2003 |
| RU | 2297477 | 4/2007 |
| UA | 73361 C2 | 3/2003 |
| WO | 88/07472 A1 | 10/1988 |
| WO | 95/07648 A1 | 3/1995 |
| WO | 97/17006 A1 | 5/1997 |
| WO | 0016643 | 3/2000 |
| WO | 01/15582 A1 | 3/2001 |
| WO | 01/60219 A1 | 8/2001 |
| WO | 01/60220 A1 | 8/2001 |
| WO | 02/19875 A1 | 3/2002 |
| WO | 02/28241 A1 | 4/2002 |
| WO | 02/44956 A1 | 6/2002 |
| WO | 02/074143 | 9/2002 |
| WO | 02/074661 A1 | 9/2002 |
| WO | 02/085170 A2 | 10/2002 |
| WO | 02/092439 A2 | 11/2002 |
| WO | 02/085170 A3 | 3/2003 |
| WO | 2003011051 | 3/2003 |
| WO | 03/026470 A2 | 4/2003 |
| WO | 03/053200 A1 | 7/2003 |
| WO | 03/065859 A2 | 8/2003 |
| WO | 03/073896 A1 | 9/2003 |
| WO | 03/065859 A3 | 12/2003 |
| WO | 03/059778 A3 | 1/2004 |
| WO | 2004069179 | 8/2004 |
| WO | 2006/043106 A2 | 4/2006 |
| WO | 2008047347 | 4/2008 |
| WO | 2008/057224 A2 | 5/2008 |

OTHER PUBLICATIONS

European Patent Office Search Report for European Application EP 04 25 0360.7 dated May 7, 2004, 3 pages.
European Patent Office Search Report for European Application EP 04 25 0361.5 dated May 4, 2004, 3 pages.
European Patent Office Search Report for European Application EP 04 25 0362.3 March 22, 2004, 3 pages.
European Patent Office Search Report for European Application EP 04 25 0363.1 dated May 17, 2004, 3 pages.
European Patent Office Partial Search Report for European Application EP 04 25 0364.9 dated May 11, 2004, 4 pages.
European Patent Office Search Report for European Application EP 04 25 0365.6 dated May 7, 2004, 4 pages.
European Patent Office Search Report for European Application EP 04 25 0366.4 dated Mar. 18, 2004, 3 pages.
European Patent Office Search Report for European Application EP 04 25 0376.3 dated Mar. 23, 2004, 3 pages.
European Patent Office Search Report for European Application EP 04 25 0377.1 dated May 7, 2004, 3 pages.
European Patent Office Search Report for European Application EP 04 25 0380.5 dated May 10, 2004, 3 pages.
European Patent Office Search Report for European Application EP 04 25 0381.3 dated May 7, 2004, 4 pages.
European Patent Office Search Report for European Application EP 04 25 0382.1 dated May 7, 2004, 3 pages.
European Patent Office Search Report for European Application EP 04 25 0383.9 dated May 28, 2004, 4 pages.
European Patent Office Search Report for European Application EP 04 25 0384.7 dated May 7, 2004, 3 pages.
European Patent Office Search Report for European Application EP 04 25 0388.8 dated Jun. 1, 2004, 3 pages.
European Patent Office Search Report for European Application EP 04 25 0389.6 dated May 17, 2004, 3 pages.
European Patent Office Search Report for European Application EP 04 0390.4 dated Jun. 17, 2004, 4 pages.
PCT Invitation to Pay Additional Fees and Communication Relating to the Results of the Partial International Search Report of the European Patent Office International Searching Authority for International Application PCT/GB2004/000265 dated Jun. 17, 2004, 6 pages.
PCT International Search Report and Written Opinion for the European Patent Office International Searching Authority for International Application PCT/GB2004/000268 dated May 24, 2004, 10 pages.
PCT Invitation to Pay Additional Fees and Communication Relating to the Results of the Partial International Search Report of the European Patent Office International Searching Authority for International Application PCT/GB2004/000272 dated May 11, 2004, 5 pages.
PCT International Search Report and Written Opinion of the European Patent Office International Searching Authority for International Application PCT/GB2004/000272 dated Sep. 7, 2004, 17 pages.
PCT International Search Report and Written Opinion of the European Patent Office International Searching Authority for International Application PCT/GB2004/000273 dated May 12, 2004, 9 pages.
PCT Invitation to Pay Additional Fees and Communication Relating to the Results of the Partial International Search Report of the European Patent Office International Searching Authority for International Application PCT/GB2004/000276 dated May 24, 2004, 7 pages.
PCT International Search Report and Written Opinion of the European Patent Office International Searching Authority for International Application PCT/GB2004/000276 dated September 7, 2004, 19 pages.

(56) References Cited

OTHER PUBLICATIONS

PCT International Search Report and Written Opinion of the European Patent Office International Searching Authority for International Application PCT/GB2004/000279 dated May 17, 2004, 9 pages.
PCT International Search Report and Written Opinion of the European Patent Office International Searching Authority for International Application PCT/GB2004/000282 dated Jun. 3, 2004, 9 pages.
PCT International Search Report and Written Opinion of the European Patent Office International Searching Authority for International Application PCT/GB2004/000287 dated Jun. 16, 2004, 10 pages.
The United Kingdom Patent Office Combined Search and Examination Report for Great Britain Application GB 0301679.7 dated Jun. 16, 2003, 4 pages.
The United Kingdom Patent Office Combined Search and Examination Report for Great Britain Application GB 0301680.5 dated Jun. 19, 2003, 5 pages.
The United Kingdom Patent Office Combined Search and Examination Report for Great Britain Application GB 0301681.3 dated Jun. 24, 4 pages.
The United Kingdom Patent Office Combined Search and Examination Report for Great Britain Application GB 0301696.1 dated May 27, 2003, 4 pages.
The United Kingdom Patent Office Combined Search and Examination Report for Great Britain Application GB 0301698.7 dated Jun. 16, 2003, 4 pages.
The United Kingdom Patent Office Combined Search and Examination Report for Great Britain Application GB 0301702.7 dated May 16, 2003, 4 pages.
The United Kingdom Patent Office Combined Search and Examination Report for Great Britain Application GB 0301708.4 dated Jun. 12, 2003, 4 pages.
The United Kingdom Patent Office Combined Search and Examination Report for Great Britain Application GB 0301709.2 dated May 8, 2003, 4 pages.
The United Kingdom Patent Office Combined Search and Examination Report for Great Britain Application GB 0301710.0 dated Jun. 12, 2003, 4 pages.
The United Kingdom Patent Office Combined Search and Examination Report for Great Britain Application GB 0301713.4 dated Jul. 16, 2003, 5 pages.
The United Kingdom Patent Office Combined Search and Examination Report for Great Britain Application GB 0301733.2 dated Jun. 27, 2003, 4 pages.
The United Kingdom Patent Office Combined Search and Examination Report for Great Britain Application GB 0301734.0 dated Jun. 27, 2003, 4 pages.
The United Kingdom Patent Office Combined Search and Examination Report for Great Britain Application GB 0301735.7 dated Jul. 4, 2003, 4 pages.
The United Kingdom Patent Office Combined Search and Examination Report for Great Britain Application GB 0301738.1 dated Jun. 9, 2003, 4 pages.
The United Kingdom Patent Office Combined Search and Examination Report for Great Britain Application GB 0301739.9 dated Jun. 17, 2003, 6 pages.
The United Kingdom Patent Office Combined Search and Examination Report for Great Britain Application GB 0301741.5 dated Jun. 16, 2003, 4 pages.
The United Kingdom Patent Office Combined Search and Examination Report for Great Britain Application GB 0301745.6 dated Jun. 17, 2003, 4 pages.
The United Kingdom Patent Office Combined Search and Examination Report for Great Britain Application GB 0301747.2 dated May 30, 2003, 5 pages.
European Patent Office Communication of a Notice of Opposition dated Mar. 22, 2007, Opposition to European Patent EP 1 440 910 B1 by Opponent Mars Incorporated, 17 pages.
Harold McGee "On Food and Cooking." The Science and Lore of the Kitchen, Harper Collins Publishers, London, 1991, p. 16.
Codex Standard for Evaporated Milks, Codex Stan A-3-1971, Rev. 1-1999, 3 pages.
European Patent Office Communication of a Notice of Opposition dated Mar. 22, 2007, Opposition to European Patent EP 1 440 910 B1 by Opponent Nestec S.A., 12 pages.
Food Composition and Nutrition Tables, Dairy Products, Medpharm Scientific Publishers, Stuttgart, 1994, 5 pages.
Notice of Opposition to a European Patent dated May 16, 2007, Opposition to European Patent EP 1 440 908 B1 by Opponent Friesland Brands B.V., 22 pages.
Notice of Opposition to a European Patent dated May 16, 2007, Oppositon to European Patent EP 1 440 908 B1 by Opponent Nestec S.A., 9 pages.
European Patent Office Communication of a Notice of Opposition dated May 22, 2007, Opposition to European Patent EP 1 440 908 B1 by Opponent Sara Lee/DE N.V., 13 pages.
"More Solutions to Sticky Problems," A Guide to Getting More From Your Brookfield Viscometer, Brookfield Engineering Laboratories, Inc., Stoughton, Massachusetts, date unknown, 28 pages.
"The Helipath Stand," A Brookfield Viscometer Accessory, Brookfield Engineering Laboratories, Inc., Stoughton, Massachusetts, date unknown, 2 pages.
European Patent Office Brief Communication dated Jul. 9, 2007, Opposition to European Patent EP 1 440 908 B1, Letter from Opponent Friesland Brands B.V. dated Jul. 3, 2007, 21 pages.
European Patent Office Communication of a Notice of Opposition dated Aug. 12, 2008, Opposition to European Patent EP 1 440 640 B1 by Opponent Nestec S.A., 17 pages.
European Patent Office Brief Communication dated Aug. 30, 2007, Opposition to European Patent EP 1 440 910 B1, Letter from Opponent Mars Incorporated dated Aug. 22, 2007, 3 pages.
Notice of Opposition to a European Patent dated Sep. 13, 2007, Opposition to European Patent EP 1 440 909 B1 by Opponent Friesland Brands B.V., 9 pages.
Notice Opposition to a European Patent dated Sep. 13, 2007, Opposition to European Patent EP 1 440 909 B1 by Opponent Nestec S.A., 7 pages.
European Patent Office Extended Search Report for European Application EP 08 25 3673.1 dated Jul. 27, 2009, 6 pages.
Official Notice of Rejection and English translation regarding corresponding Japanese Patent App. No. 2010-070102, mailed Jun. 15, 2012 (4 pages).
EPO Search Opinion and Report regarding Application No. EP09250901.7, dated Mar. 18, 2010 (10 pages).
Non-final Rejection and Examiner's Search Strategy and Results regarding corresponding Application No. US20100247714, dated Oct. 24, 2012 (21 pages).
Official Notice of Rejection and English translation regarding corresponding Russian Patent App. No. 2010111709, mailed Mar. 14, 2011 (10 pages).
Official Notice of Rejection, English Translation, and Examiner's Search Report regarding corresponding Chinese Patent App. No. 201010187999.7, mailed Jun. 27, 2012 (16 pages).

\* cited by examiner

BEVERAGE CONCENTRATES

CROSS-REFERENCE TO RELATED APPLICATIONS

This application is a divisional of U.S. patent application Ser. No. 12/748,171, filed Mar. 26, 2010, which claims the benefit of European Patent Application No. 09250901.7, filed Mar. 27, 2009, which are both hereby incorporated by reference in their entireties.

FIELD OF THE INVENTION

The present invention relates to beverage concentrates comprising thickeners. More particularly, the present invention relates to beverage concentrates comprising thickeners for use in beverage preparation systems and to beverage concentrates having a mixture of thickeners that provides enhanced organoleptic properties.

BACKGROUND OF THE INVENTION

Beverage dispensing systems rely on the use of beverage concentrates to provide beverages. A beverage dispensing system may comprise or consist of a beverage dispensing machine and a cartridge comprising a beverage concentrate. In use, the beverage concentrate is typically diluted with between 0.1 part and 10 parts by weight of an aqueous medium inside the beverage dispensing system to provide a beverage that is then dispensed from the beverage dispensing system from an outlet. The beverage may sometimes be further diluted with additional aqueous fluids, for example milk. Thus, beverage concentrates provide a convenient and efficient way of providing a consumer with a beverage.

Cartridges for use in a beverage dispensing systems typically comprise one or more chambers containing beverage concentrate. The cartridge and beverage dispensing system may be configured so that the beverage concentrate is mixed with the aqueous medium inside the cartridge; alternatively (or additionally), mixing with an aqueous medium may take place outside the cartridge within the beverage dispenser itself. In either case, the beverage dispensing system comprises an outlet downstream of the chamber(s) containing the beverage concentrate for the discharge of a beverage and a flow path connecting the concentrate chamber(s) to the outlet. The system may be further provided with a means for mixing the beverage concentrate with an aqueous medium to form the beverage either in the cartridge itself or elsewhere in the beverage preparation system. The aqueous medium may typically be a fluid or liquid such as water or milk.

One type of beverage dispensing system makes use of single-serving cartridges to provide the beverage concentrate. The cartridges may be sealed and formed of substantially air- and water-impermeable materials. In order to allow the beverage to brew and/or be diluted within the cartridges, the cartridges may comprise an inlet for the introduction of an aqueous medium into the cartridge, an outlet downstream of the inlet for the discharge of a beverage from the cartridge and a flow path connecting the inlet to the outlet. By providing the beverage concentrate within the flow path connecting the inlet and outlet of the cartridge, for example within a chamber, the cartridges conveniently provide an integrated means for mixing the beverage concentrate with an aqueous fluid.

Previously, certain thickeners have been used in beverage concentrates for beverage dispensing devices. For example, WO 02/074143 describes the use of a number of gums and starches in a beverage brewing device. These gums and starches appear to be contained in a solid concentrate, for example one in which different ingredients have been agglomerated together. Separately, US 2008/0014315 describes a fountain syrup comprising a foam-creating composition comprising a dairy composition and a hydrocolloid composition, a flavouring agent and a sweetening agent.

SUMMARY OF THE INVENTION

The present invention provides a cartridge for a beverage preparation system, the cartridge comprising an inlet for the introduction of an aqueous medium into the cartridge, an outlet downstream of the inlet for the discharge of a beverage from the cartridge and a flow path connecting the inlet to the outlet, wherein the flow path includes within it a non-gelled beverage liquid concentrate containing about 0.01 to about 5 weight % in total of one or more thickeners.

The present invention further provides a method of dispensing a beverage from a cartridge containing a beverage liquid concentrate comprising an alginate and/or a thermally reversible gelling thickener dissolved in the concentrate, the method comprising the steps of: passing an aqueous medium through the cartridge to form a beverage by dilution of said beverage concentrate, and dispensing the beverage into a receptacle, wherein the overall weight ratio of the beverage concentrate to the aqueous medium is from about 10:1 to about 1:10.

The present invention further provides a beverage dispensing system comprising a cartridge containing a concentrate chamber comprising beverage concentrate, an outlet downstream of the concentrate chamber for the discharge of a beverage, a flow path connecting the concentrate chamber and the outlet, the flow path containing a means for mixing the beverage concentrate with an aqueous medium, wherein the flow path has a maximum cross-section area of X and a minimum cross-section area of Y, wherein the ratio of X to Y is about 20 or greater, and wherein the beverage concentrate is a non-gelled beverage liquid concentrate or a solid beverage concentrate comprising an alginate and/or a thermally reversible gelling thickener.

The present invention further provides a beverage concentrate comprising a thickener, wherein the thickener comprises methyl cellulose and at least one alginate in a weight ratio of 1:5 to 5:1, wherein the methyl cellulose and the at least one alginate are present in a combined amount of about 0.01 to about 5 weight %. The invention further provides the use of a sodium alginate and methyl cellulose to improve the organoleptic properties, preferably the mouthfeel, of a beverage prepared from a beverage concentrate, wherein the methyl cellulose and at least one alginate in a weight ratio of 1:5 to 5:1.

DETAILED DESCRIPTION OF THE PREFERRED EMBODIMENT

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The inventors of the present invention have investigated the use of thickeners in beverage concentrates. During these investigations, the inventors recognised that the selection of a specific thickener or mixture of thickeners can contribute to advantageous properties of the beverage concentrate.

In particular, the inventors have found that it is advantageous for a thickener to contribute to the thickness and texture of a final prepared beverage but, in some systems, it is desirable for the thickener not to have the same thickening effect in the beverage concentrate and/or before the beverage is dispensed from the beverage dispensing system. The inventors have also found that a combination of thickeners achieves these advantageous thickness properties while at the same time contributing to a surprising mouthfeel of a final prepared beverage.

These advantages of the present invention will now be described in relation to three aspects. It is to be understood that the features of each of these aspects may be, unless specifically stated, freely combined with any of the other aspects.

In a first aspect, the inventors have found that a thickener that causes a beverage liquid concentrate to form a gel and/or have an excessive thickness can render the beverage concentrate impossible to brew and/or dilute. This may result in a weak, watery drink being dispensed from the dispenser, which lacks the advantageous mouthfeel that was the original reason for adding the thickener to the beverage concentrate. The inventors have also found difficulty in loading beverage concentrates into single-serving cartridges if the beverage liquid concentrate takes the form of a gel and/or has an excessive thickness.

In a second aspect, the inventors have found that, if a thickener that causes a beverage liquid concentrate to form a gel and/or have an excessive thickness, gel pieces can be formed when the beverage concentrate mixes with an aqueous fluid. These gel pieces can block narrow constrictions in the flow path, thereby causing an increase in the pressure required to dispense the beverage from the beverage system. The inventors have further found that it is possible to provide a solid beverage concentrate that thickens once dispensed from the beverage dispensing system, thereby reducing the pressure needed to cause a prepared beverage to flow through narrow constrictions in the flow path between the point of mixing of the aqueous fluid and the beverage concentrate and the outlet of beverage dispensing system.

In a third aspect, the inventors have found a combination of two thickeners that have all the advantages of the first two aspects of the invention and further provides a surprising mouthfeel to a prepared beverage.

Each of these aspects will now be described in greater detail.

In a first aspect of the invention, the inventors have recognised the convenience to the consumer of providing a beverage concentrate in a cartridge in which the beverage is diluted and/or brewed. In use, these cartridges may be placed inside a beverage preparation machine. An aqueous medium, for example water and/or steam, is then introduced into the cartridge from the beverage preparation machine. The aqueous medium mixes with the beverage concentrate within the cartridge and then the mixed beverage is dispensed from the cartridge. Optionally, other ingredients may be added to produce the final beverage, such as milk. The combination of the cartridge and beverage preparation machine may be termed a beverage preparation system.

Beverages that are prepared in this way include, but are not limited to, coffee, tea and hot chocolate. It is to be noted that the terms "brewed" and "diluted" are used interchangeably herein to refer both to the brewing of, for example, coffee and tea and to the dilution of, for example, a chocolate concentrate.

The inventors have recognised that some beverages may benefit from having thickeners added to them. For example, some flavoured coffees may benefit from the addition of thickeners to the beverage. Examples of flavours added to coffee include, but are not limited to, cocoa (including chocolate), vanilla, alcoholic (including liqueur flavour), caramel, mint, dairy, herbs, spices (including cinnamon), nuts and/or berries.

The inventors have then investigated the possibility of using thickeners in beverage concentrates contained in cartridges so that beverages with thicker, luxurious mouthfeel may be easily and reliably prepared using a beverage preparation system.

In a first aspect of the invention, the inventors have investigated the use of a thickener in a beverage liquid concentrate in a cartridge for a beverage dispensing device. However, the inventors have found that most thickeners are unsuitable for use with a beverage concentrate comprising a liquid ingredient.

Without wishing to be bound by theory, the inventors have found that food thickeners tend to dissolve in a liquid ingredient contained in a beverage concentrate. When dissolved, the thickener acts to thicken the composition and tend to form a gel. The inventors have found that, when an aqueous medium is added to a viscous concentrate or gel beverage concentrate, it takes a significant time for the aqueous medium to mix with the beverage concentrate. For example, diffusion mixing of the aqueous medium with the beverage concentrate may be prevented or significantly slowed and mixing may instead be required to be preceded by thermal transfer from the aqueous medium to the beverage concentrate in order to reduce the thickness of the beverage concentrate. This may not only increase the time taken to brew/dilute a drink to a pre-determined strength, but it may also result in not all of the beverage concentrate being mixed with the aqueous medium, resulting in not all of the beverage concentrate being transferred to the receptacle when dispensed. This problem is aggravated if the beverage concentrate contains any solids, when inadequate mixing may result in not all of the solids being dissolved (if the solids are soluble solids) or not all of the solids contributing to the taste of the final beverage.

The inventors have then surprisingly found a beverage liquid concentrate comprising a thickener may be provided in a non-gel form. The inventors have found this to be advantageous because it allows the beverage liquid concentrate to easily mix with an aqueous fluid introduced into the cartridge, thereby decreasing the time taken to brew/dilute a drink to a pre-determined strength and increasing the reliability of the brew.

Therefore, in a first aspect, the present invention provides a cartridge adapted for use in a beverage preparation system, the cartridge containing a beverage concentrate and the cartridge being configured so that, in use, the beverage concentrate mixes with the an aqueous medium to brew a beverage. The cartridge may be configure for use with a beverage preparation machine. The beverage concentrate is a non-gelled beverage liquid concentrate containing a thickener in an amount sufficient to provide a pre-determined thickening effect to the final beverage.

As noted above, the beverage concentrate in the first aspect of the invention is a liquid beverage concentrate. "Liquid concentrate" refers to a concentrate comprising one or more liquid ingredients. "A liquid ingredient" refers to one ingredient that is liquid at ambient temperature (e.g. room temperature, such as 20° C.). The liquid ingredient contained in the beverage concentrate may, for example, comprise water; alternatively or additionally, the liquid ingredient may, for example, comprise corn syrup (e.g. glucose syrup) and/or other syrups containing mono-, di- or polysaccharides. An example of a liquid ingredient that is used for the preparation of a chocolate-based drink is liquid chocolate, such as the liquid chocolate described in EP 1440910, which is hereby incorporated by reference in its entirety. Preferably, the total amount of liquid ingredients contained in the beverage concentrate is from about 40 to about 100% by weight, for example about 60 to about 99% by weight, such as about 80 to about 97% by weight, for example about 90 to about 95%. These weight percentages are given as a percentage of the total weight of the beverage concentrate, i.e. as percentage of the combined weight of the liquid and solid ingredients. In particular, the brew/dilution time and reliability of the brew may be increased with a greater amount of liquid ingredients. However, sometimes some ingredients are preferably provided as solids in order to preserve their flavour until brewing/dilution. For example, a coffee extract may be provided in solid form, for example as soluble coffee. Partially insoluble solids may also be provided to improve brew flavour, such as roast and ground coffee. Thus, the beverage liquid concentrate may comprise, for example, from about 0 to about 60 weight % solids contents, for example about 2 to about 40 weight %, such as about 3 to about 20 weight %, for example about 5 to about 10 weight %.

The beverage liquid concentrate is non-gelled. The terms "gel" and "gelled" are well-known to the person skilled in the art as referring to a system that exhibits no flow under steady-state conditions at 20° C. More preferably, the viscosity of the beverage liquid concentrate is about 4000 mPa·s or less, more preferably about 1000 mPa·s or less, more preferably about 500 mPa·s or less, such as about 200 mPa·s or less. The inventors have found these viscosities contribute to the facile mixing of the beverage concentrate with the aqueous fluid. On the other hand, the viscosity of the beverage liquid concentrate may be about 1 mPa·s or more, more preferably about 10 mPa·s or more or more, more preferably about 50 mPa·s or more. The inventors have found that these minimum viscosities tend to result from a concentration of ingredients in the beverage concentrate apart from the thickener that allows the beverage concentrate to be able to be diluted and still provide a final beverage of desired brew strength.

Accordingly, preferred ranges of viscosities at 20° C. and 100 rpm include about 1 to about 4000 mPa·s, for example about 10 to about 1000 mPa·s, such as about 10 mPa·s to about 500 mPa·s.

Viscosity is measured by a Brookfield DVII viscometer. The thickeners may be selected so that the beverage concentrate has these viscosities at 20° C. For example, the concentration of the preferred thickeners discussed below (an alginate and/or a thermally reversible gelling thickener) may be selected to achieve these viscosities. Viscosity may be measured at 100 rpm using spindle 3.

Preferably, the thickener may be partially or fully dissolved in the liquid ingredient(s) and/or be contained in colloidal form in the liquid ingredient. For example, if the beverage concentrate contains both solid and liquid ingredients, it may be described as having a continuous phase (the liquid ingredient(s)) and a discontinuous phase (the solid ingredient(s)) and the thickener is partially or completely contained in the continuous phase, either completely dissolved or as a colloid. If the thickener is contained in a colloidal form, it may not separate from the beverage concentrate over time (e.g. one in which no or substantially no separation of the thickener from the liquid ingredient and/or settling of the thickener to the bottom of the container occurs when left in a sealed container at 20° C. for 7 days).

Preferably, about 50% to about 100% by weight of the thickener may be contained in the liquid ingredient(s)/continuous phase, either dissolved or in colloidal form, more preferably about 80% to about 100% by weight, for example about 100% by weight. In particular, a greater amount of thickener dissolved in the liquid ingredients may result in a quicker and more reliable beverage brew. The thickener may be dissolved in the beverage concentrate by mixing the ingredients of the beverage concentrate before they are added to the cartridge, for example in a mixer, such as in a vacuum mixer.

The thickeners may be provided in the continuous phase of the liquid concentrate in a number of ways known in the art. For example the thickeners may be provided in a substantially or fully hydrated form. In particular, the thickener may be subject to a hydration technique, such as sugar hydration. The thickener and the liquid ingredients of the concentrate may also be subject to high-shear mixing. The inventors have found that, by pre-hydrating the thickeners, all the thickeners are more likely to dissolve in the time before the brewed beverage is dispensed from the beverage cartridge.

Preferably, the beverage concentrate comprises about 0.01 to about 5 weight % of thickener. These weight percentages indicate the total concentration of thickeners and/or the total concentration of the two preferred thickeners (an alginate and/or a thermally reversible gelling thickener, discussed in greater detail below). More preferably, the beverage concentrate comprises about 0.01 weight % to about 2 weight % of thickener, more preferably about 0.1 to about 1 weight % of thickener, for example about 0.2 weight % to about 0.8 weight %, even more preferably about 0.5 weight %. The inventors have found that, at too low concentration, the thickening effect of the thickener is reduced, while at high concentration, the thickener tends to become less easy to dissolve in the liquid ingredient.

"Thickeners" are well-known in the art. They are thickening agents that increase the thickness of a beverage. They may be provided in solid form (at 20° C.) and then dissolved or dispersed in a liquid or they may be provided with the solid thickener pre-dissolved or pre-dispersed in a liquid. They may be used, for example, to enhance the body and mouthfeel characteristics of a beverage.

The inventors have further found that certain thickeners have preferable properties for overcoming the problem of over-thickening the beverage liquid concentrate. These thickeners include an alginate and/or a thermally reversible gelling thickener. For example, the beverage liquid concentrate may comprise one or both of an alginate and/or a thermally reversible gelling thickener. The inventors have found that these thickeners may be incorporated into a cartridge without resulting in a beverage concentrate that does not easily mix with an aqueous medium when introduced into the cartridge.

The thickener may be or may comprise an alginate. Without wishing to be bound by theory, the inventors have found that alginates may thicken when mixed with calcium ions ($Ca^{2+}$). Accordingly, the alginate may be dissolved in the beverage liquid concentrate in an unbound form to produce a non-gelled concentrate. Then, on addition of an aqueous fluid comprising calcium ions, the aqueous fluid mixes with the beverage concentrate and only then does it thicken. For example, calcium ions may be intentionally added to the aqueous fluid; or the calcium ions may already exist in the aqueous fluid, for example as 'hard' impurities in tap water. Alternatively, the alginate may be dissolved in an aqueous fluid that does not include calcium ions. The beverage dispensed from the cartridge may then be mixed with a source of calcium ions in a receptacle in which it is served, for example with milk.

The term "alginate" is well-known in the art. Commercial alginates are derived from a variety of seaweed sources. Different seaweeds produce alginates of different monomeric composition and block structure and therefore the calcium reactivity of an alginate may depend on its source. In particular, alginates may comprise a linear co-polymer comprising-D-mannuronic acid and L-guluronic acid monomeric units. These monomers may occur in the alginate molecule as blocks of individual monomer units (M-blocks or G-blocks), or as regions in which the monomers approximate an alternating sequence. Alginates may be referred to as "high M" or "high G", depending on the proportions of mannuronic acid and guluronic acid they contain. An example of a high M alginate is that obtained from giant kelp, *Macrocystis pyrifera*, harvested off the California coast. One mechanism of thickening of the alginates is thought to be the alignment of two buckled G-block regions resulting in a diamond shaped hole having dimensions that are ideal for the cooperative binding of divalent ions, such as calcium ions. In the present invention, high M alginates (e.g. ones having a M content as a proportion of the total number of M and G units of over 50%) may be used because of their controllable thickening characteristics.

The alginate may be a soluble alginate and, as such, is preferably soluble in water at 20° C. As such, preferably the alginate completely dissolves in water at 20° C. Examples of soluble alginates are well-known in the art. They include sodium, potassium and ammonium alginate. However, pre-gelled calcium alginate may not be soluble in water. A particularly preferred alginate is sodium alginate, which the inventors have found to be particularly versatile in its properties and its reliability in thickening.

The inventors have found alginates to be preferable in use over other thickeners because of their thickening properties. In particular, alginates have been found to rapidly and controllably thicken in the presence of calcium ions. In contrast, the inventors have found other thickeners, for example carrageenan thickeners, to only thicken slowly, as the beverage cools. Therefore, by using an alginate, the final beverage may not substantially change its viscosity over time, which is advantageous for consumers.

The alginate may be provided in a form that is substantially unbound to a divalent cation but capable of binding to a divalent cation, for example calcium ($Ca^{2+}$). For example, the alginate may be provided in a form having about 70% to about 100% by weight unbound to a divalent cation (e.g. calcium), for example 90% to 100% by weight, such as about 100% by weight. The amount unbound to a divalent cation (e.g. calcium) may be for example measured by titrating the composition at room temperature with a calcium ion solution (for example, one having a 1 molar concentration of calcium ions); recording the point at which the viscosity of the composition no longer increases with addition of new calcium ions; and then expressing this amount as a fraction of the amount of the calcium ion solution required to thicken the concentration of a control sodium alginate solution to the point at which its viscosity no longer increases.

The thickener may be or may comprise a thermally reversible gelling thickener. These thickeners exhibit the property of increased viscosity at higher temperature. This property is called reversible thermal gellation. For example, these thickeners may exhibit a higher viscosity at 80° C. than 20° C. when dissolved in the beverage concentrate, for example twice as viscous, such as three times as viscous using the conditions to measure viscosity previously described (but varying the temperature).

The inventors have found these thickeners to be advantageous because they tend not to form a gel or very viscous composition at room temperature in concentrated form, but increase their viscosity at higher temperature. As such, these thickeners are particularly advantageous when the aqueous fluid added to the cartridge is provided 'hot', i.e. from about 50° C. to about 100° C., for example from about 70° C. to about 90° C., such as about 80° C. Alternatively, the aqueous fluid may be introduced into the cartridge 'cold' (i.e. at 5 to 50° C., for example about 20° C.) and then the beverage dispensed from the cartridge heated up afterwards, for example by adding to a hot liquid (e.g. milk). In this way, at the point when the aqueous fluid comes into contact with the beverage concentrate, the concentrate is not a gel or highly viscous. While the beverage concentrate heats up quickly, the beverage concentrate has time to fully mix with the aqueous fluid before the thickening effect of the thermally reversible thickener at the higher temperature has time to prevent the mixing of the beverage concentrate with the aqueous fluid.

Figure 1:
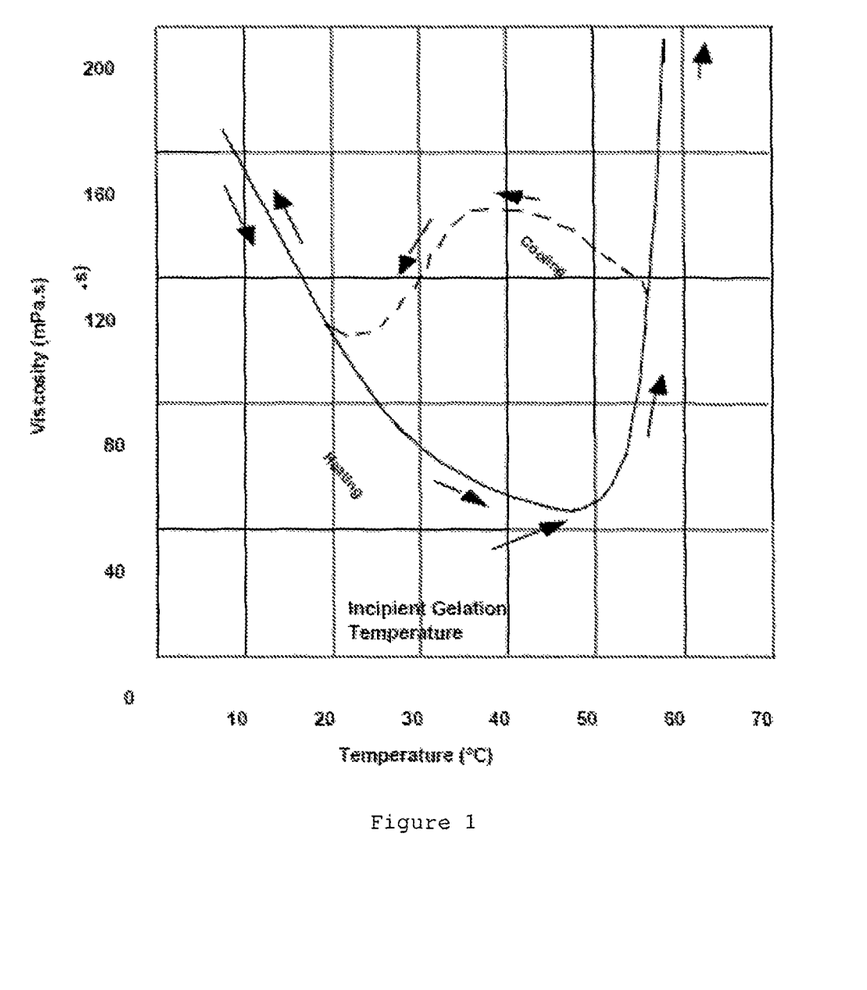
FIG. 1 shows the viscosity/temperature relationship for a thermally reversible gelling thickener (methyl cellulose).

Examples of two thermally reversible thickeners are methyl cellulose and hydroxypropylmethyl cellulose (HPMC). These are available under the trade name of Metho-Cel from Dow Chemicals. Methylcellulose is a particularly preferred thermally reversible gelling thickener because of its mouthfeel properties. Its thermal/viscosity profile is illustrated in FIG. 1.

In a preferred embodiment, the beverage liquid concentrate comprises both methyl cellulose and an alginate. As described herein, the inventors have found this combination of thickeners to provide an advantageous mouthfeel to the final prepared beverage.

If the beverage concentrate contains an alginate, the concentrate may be provided with a calcium ion sequesterant. Calcium ion sequesterants complex to calcium ions, thereby reducing the concentration of calcium ions available to complex with the alginate. For example, a calcium ion sequesterant may be used to complex to calcium ions present in the aqueous fluid, for example as 'hard' impurities in water.

Examples of calcium ion sequesterants include tri-sodium citrate, di-sodium phosphate, di-potassium phosphate, sodium orthophosphate, tetra sodium pyrophosphate and sodium hexameta phosphate.

Preferably, the calcium ion sequesterant is present in a ratio relative to the alginate of 1:10 to 10:1, for example 1:5 to 5:1, such as 1:2 to 2:1. The inventors have found that a calcium ion sequesterant may work effectively inside these limits. If the concentration is low, the effectiveness of the action of the sequesterant may be reduced; if the concentration is too high, the amount of calcium required to cause a thickening effect of the alginate may be significantly increased.

Examples of further additional ingredients that may be included in the beverage concentrate include, but are not limited to, ground coffee, coffee extracts (including instant coffee), tea leaves, tea extracts, chocolate solids, and flavourings. For example, the beverage concentrate may further comprise flavour syrups, cocoa (including any part derived from the cocoa bean, such as cocoa mass, cocoa nibs, cocoa powder), herbs, spices and flavourings such as vanilla, strawberry, raspberry, orange, melon, caramel, cream and biscuit.

Preferably, one of the liquid ingredients in the beverage concentrate is a liquid comprising one or more saccharide (mono-, di- or poly-saccharide). For example, a suitable liquid ingredient may be a monosaccharide syrup or a disaccharide syrup. For example, the liquid ingredient may be a corn syrup (e.g. glucose syrup). Preferably, this liquid ingredient is provided in an amount of about 10 weight % to about 90 weight %, for example about 30 weight % to about 75 weight %, for example about 60 weight %. In particular, the inventors have found that, by pre-blending the thickeners with the liquid comprising one or more saccharides, the thickeners may be advantageously dispersed and/or dissolved in the liquid. In other words, the liquid separates the powder particles so that they do not aggregate together when an aqueous medium is added to them.

In a preferred embodiment, the beverage concentrate thickener may comprise 80 to 99% by weight liquid ingredients and 1 to 20 weight % solid ingredients. The liquid ingredients may comprise 0.01 to 5% by weight of dissolved thickener. This thickener may comprise or may be an alginate and/or a thermally reversible gelling thickener. The alginate and/or the thermally reversible gelling thickener may be at a concentration, either singularly or in combination, of 0.01 to 5% by weight. The liquid ingredients and/or solid ingredients may further comprise one or more flavourings, such as cocoa (including chocolate), vanilla, alcoholic (including liqueur flavour), caramel, mint, cinnamon, nuts and/or berries. The solid ingredients may be or may comprise a coffee extract, such as a soluble coffee.

Figure 3:
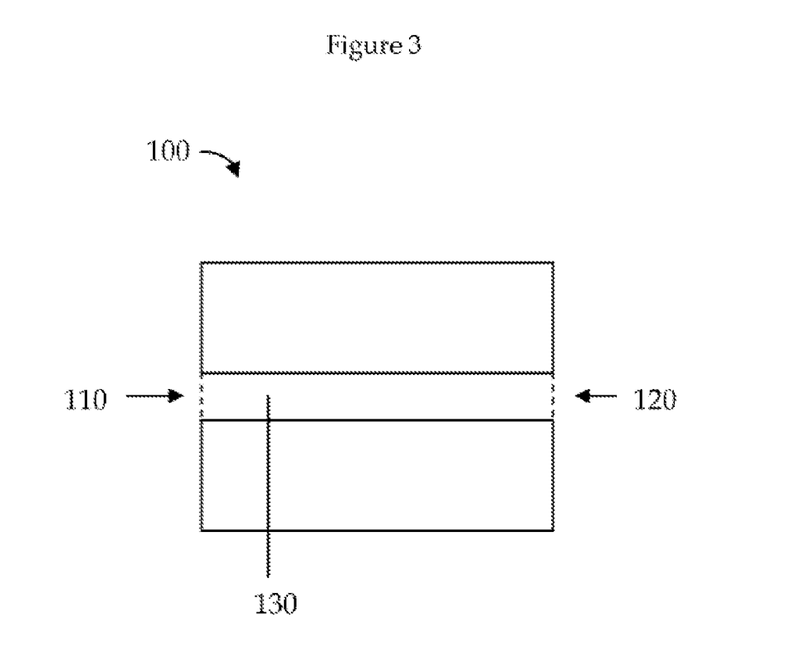
FIG. 3 includes a cartridge according to various non-limiting embodiments.

As shown in FIG. 3, turning to the actual cartridge 100 that may be used in the first aspect of the invention, the cartridge 100 comprises an inlet 110 for the introduction of an aqueous medium into the cartridge 100, an outlet 120 downstream of the inlet 110 for the discharge of a beverage from the cartridge 100 and a beverage flow path 130 linking the inlet 110 to the outlet 120. It will be understood that by the term "cartridge" as used herein is meant any package, container, sachet, receptacle or brewing or dilution device which contains a beverage concentrate as described herein. The cartridge 100 may be rigid, semi-rigid or flexible. The cartridge 100 may be formed from substantially air- and water-impermeable materials. The cartridge 100 may be provided sealed. For example, the inlet 110 and outlet 120 may be covered by a membrane (for example, a laminate) (not shown), which may be pierced in use to allow introduction of an aqueous fluid and the dispensing of a beverage. The beverage concentrate may, for example, be provided within a chamber 100 contained in the flow path 130. Other components may optionally be included in the cartridge 100, such as a filter (not shown). A suitable cartridge for use in the present invention is described in EP 1440908, the contents of which are incorporated herein in their entirety by reference.

In one embodiment, the cartridge of the present invention is preferably a single-serving cartridge. In particular, the inventors have further found difficulty in loading pre-gelled or very viscous beverage concentrates into cartridges without heating the beverage concentrates to modulate their viscosities. Loading a cartridge with beverage concentrate at from about 0° C. about 50° C., for example about 10° C. to about 35° C., is preferred so that a simpler loading apparatus may be used without the requirement for specialist heating equipment to be incorporated into the loading apparatus. The inventors have found the beverage concentrates of the present invention to overcome this problem because of their particular thickening properties.

Accordingly, preferably the beverage flow path containing the beverage concentrate has a volume of about 5 ml to about 500 ml, more preferably about 10 ml to about 100 ml. Thus, the consumer can be provided with the convenience of being provided with a single serving of a beverage and being able to dispose of the cartridge after its single use. In addition, preferably the amount of beverage concentrate provided in the cartridge is between about 1 g and 50 g, more preferably between about 5 g and 25 g.

Preferably, the ratio of the volume of the beverage concentrate to the volume of beverage flow path containing the beverage concentrate is from about 1:1 to about 1:100, such as about 1:2 to about 1:40, more preferably from about 2:5 to about 1:20, such as from about 1:3 to about 1:10. Thus, an aqueous fluid may be conveniently introduced into the cartridge for brewing the beverage.

In use, a beverage may be dispensed from the cartridge containing a non-gelled beverage liquid concentrate comprising a thickener by a method comprising the steps of:
passing an aqueous medium through the cartridge to form a beverage by dilution of said beverage concentrate, and
dispensing the beverage into a receptacle,
wherein the overall weight ratio of the beverage concentrate to the aqueous medium introduced into the cartridge is about 10:1 to about 1:10.

In particular, the inventors have found the range of dilution of about 10:1 to about 1:10 to provide a convenient and reliable way of providing a consumer with a beverage in a cartridge that is small and convenient for a consumer, for example about 5:1 to about 1:10, such as about 1:1 or about 1.2 to about 1:8.

In use, the aqueous medium may be introduced into the cartridge above room temperature. For example, the temperature of the aqueous medium when introduced into the cartridge may be from about 50° C. to about 100° C., for example from about 70° C. to about 95° C., such as about 85° C. The aqueous medium may be heated to this temperature by a heater provided in the beverage dispenser.

The method may comprise the additional step mixing the mixture of beverage concentrate and the aqueous medium with another aqueous medium, such as milk. This may occur, for example, either in the receptacle. If the aqueous medium is not added to the cartridge hot, the method may also comprise heating the mixture of beverage concentrate and the aqueous medium to a temperature of from 50° C. to about 100° C., for example from about 70° C. to about 95° C., such as about 85° C. after it has passed through the constriction. This may be achieved, for example, either in the beverage dispenser itself or in the receptacle, for example by adding the mixture of beverage concentrate and the aqueous medium to a heated fluid, such as milk.

The beverage dispenser used in the first aspect of the present invention may comprise a housing containing a water heater, a water pump, optionally an air compressor, a control processor, a user interface and a head. The head may comprise a holder for holding, in use, the cartridge. The beverage preparation machine may also be provided with a water tank.

The housing of the beverage dispenser may comprise a dispense station where dispensation of the beverage takes place. The dispense station may comprise a receptacle stand having a hollow interior forming a drip tray.

The head of the beverage dispenser may be located towards the top of the housing above the receptacle stand. The holder of the head may be shaped to receive the cartridge of the first aspect and to hold the cartridge in the correct orientation such that water may be passed through the cartridge. The holder and head may be provided with sealing means for sealing around a periphery of the cartridge to prevent by-pass flow of water in use. The head may be designed to direct flow of water downwardly through the cartridge so that beverage exits the cartridge through a lowermost surface of the cartridge. Alternatively, the head may be designed to direct flow of water upwardly through the cartridge so that beverage initially exits the cartridge through an uppermost surface of the cartridge before being ultimately directed downwardly to a receptacle.

The user interface may be located on the front of the housing and comprises a start/stop button, and a plurality of status indicators. The water tank may be located to the rear of the housing and is connected in use to a water tank station located at a rear half of the housing. The water pump may be operatively connected between the water tank and the water heater and controlled by the control processor.

The water heater may be located in the interior of the housing. The heater is preferable capable of heating water received from the water pump from a starting temperature of approximately 20° C. to an operating temperature of around 85° C. in under 1 minute.

The control processor of the beverage preparation machine may comprise a processing module and a memory. The control processor is operatively connected to, and controls operation of, the water heater, water pump, air compressor and user interface.

An example of a beverage dispenser that may be used in the present invention is described in PCT/GB2005/004113, the contents of which are incorporated herein by reference.

During their investigations, the inventors recognised a further problem associated with the use of a beverage concentrate comprising a thickener in a beverage dispenser. In particular, the inventors have recognised that some beverage dispensers contain a constriction in the flow path between the point at which a liquid beverage concentrate is mixed with an aqueous fluid and the outlet of the beverage dispenser. In use, the inventors have found that, if a gelled concentrate is not fully dissolved in the aqueous fluid and some gel remains, the gel can be caught by the constriction in the flow path to block the beverage dispenser. Additionally or alternatively, if the beverage is too thick, the pressure required to force the mixture of the beverage concentrate and the aqueous fluid through the constriction becomes too great.

Accordingly, in a second aspect, the present invention provides a beverage dispensing system comprising:

a cartridge containing a concentrate chamber comprising beverage concentrate, an outlet downstream of the concentrate chamber for the discharge of a beverage, a flow path connecting the concentrate chamber and the outlet, the flow path containing a means for mixing the beverage concentrate with an aqueous medium to form the beverage, wherein the flow path has a maximum cross-section area of X and a minimum cross-section area of Y, wherein the ratio of X to Y is about 20 or greater, and wherein the beverage concentrate is a non-gelled beverage liquid concentrate or a solid beverage concentrate comprising an alginate and/or a thermally reversible gelling thickener.

The preferred features of the non-gelled concentrate of this second aspect are the same as those previously described in the first aspect of the invention.

The cartridge used in this second aspect may be provided connected to a flow path, for example by being provided with an outlet connected to the beverage flow path. It may be provided in single-serving or multiple-serving form. However, in a preferred embodiment of this second aspect, the beverage concentrate is provided in a cartridge according to the first aspect. In other words, the cartridge may be provided with an inlet and outlet and a means for mixing the concentrate with an aqueous fluid and, as such, the cartridge may be the cartridge defined in the first aspect. In this case, the cartridge may be further provided with a constriction or aperture having a ratio of X to Y as defined above. Thus, the constriction or aperture may be provided downstream of a chamber that contains (pre-brewing/pre-dilution) the beverage concentrate contained in the flow path between the inlet and outlet of the cartridge.

As well as a non-gelled beverage liquid concentrate, the second aspect of the invention may provide a cartridge containing a solid beverage concentrate comprising an alginate (as previously defined). While the use of solid concentrates may have disadvantages over liquid concentrates such as increased brew/dilution times and less reliable brewing, the inventors have found that a solid alginate and/or a solid thermally reversible gelling thickener may be used to provide the delayed-thickening of the beverage until after the beverage is dispensed from the beverage dispenser.

In particular, an alginate may thicken in the presence of calcium ions. Thus, when provided in a solid concentrate, the alginate may be dissolved in the aqueous fluid and be dispensed into a receptacle. Then, a liquid comprising calcium ions may be added to the receptacle, for example milk. Only then does the alginate thicken by complexing to the calcium ions. Therefore, the thickening of the beverage may be delayed until it is dispensed out of the beverage dispenser into a receptacle. In this way, the beverage is not thickened before it passes through the constriction in the flow pathway, only afterwards. Therefore, the pressure needed to pass the beverage through the constriction is reduced, facilitating the passage of the beverage through the beverage dispenser.

In addition, the inventors have recognised that thermally reversible gelling thickeners increase their viscosity at higher temperature. Therefore, if provided in solid form the thickener may, for example, be dissolved (e.g. into colloidal form) in a cold fluid (e.g. one having a temperature of 5° C. to 50° C.), passed through a constriction and then mixed (either in the beverage preparation system or in the receptacle itself) with a hot fluid to provide thickness after the dissolved thickener has passed through the constriction.

As used herein, the term "solid concentrate" refers to a concentrate that contains substantially no liquid ingredients (i.e. liquid at 20° C.). For example, the solids content may be about 95 weight % or greater, such as about 98 weight % or greater, for example 99 weight % or greater, such as about 100 weight %. While less convenient for brewing/dilution, solid concentrates tend to have a longer shelf-life than liquid concentrates unless the liquid concentrates are suitably packaged.

The preferred features (for example, the weight % of the alginate, preferred additional ingredients and the inclusion of a calcium ion sequesterant) of the solid concentrate are the same as those previously described for the beverage liquid concentrate of the first aspect.

Thus, the second aspect may further provide a cartridge according to the first aspect of the invention provided with a solid concentrate comprising an alginate and/or a thermally reversible gelling thickener in the place of the liquid beverage concentrate of the first aspect.

Whatever form the concentrate takes, preferably, the beverage concentrate comprises about 0.01 to about 5 weight % of thickener. More preferably, the beverage concentrate comprises about 0.01 weight % to about 2 weight % of thickener, more preferably about 0.1 to about 1 weight % of thickener, for example about 0.2 weight % to about 0.8 weight %, even more preferably about 0.5 weight %. The inventors have found that, at too low concentration, the thickening effect of the thickener is reduced, while at high concentration, the thickener tends to become less easy to dissolve in the liquid ingredient. Preferably, if an alginate and/or a thermally reversible gelling thickener are provided, they are provided having the above ranges of weight.

The cartridge of this second aspect may be rigid, semi-rigid or flexible. The cartridge may be formed from substantially air- and water-impermeable materials. The cartridge may be provided sealed except for its connections to the beverage preparation system. For example, the inlet and outlet (if present) of the cartridge may be covered by a membrane (for example, a laminate), which may be pierced in use to allow introduction of an aqueous fluid and the dispensing of a beverage.

The cartridge may also be separated from the means for mixing the beverage concentrate with the aqueous fluid. Thus, the beverage concentrate may be conveniently provided in greater than a single-serving quantity. For example, the beverage dispenser may be provided with a cartridge containing multiple servings of the beverage concentrate and a metering device for providing a metered amount of beverage concentrate to the flow path for mixing with an aqueous fluid.

The ratio of X to Y measures the constriction in the flow path. It is noted that the cross-section of the flow path is measured perpendicular to the flow path itself. If the flow path splits into a series of parallel flow paths and the flow path is configured so that, in use, the beverage concentrate/prepared beverage passes through all of the parallel flow paths, then the total cross-section of the flow path is taken to be the sum of the cross-sections of the individual parallel flow paths.

Preferably, the ratio of X to Y is about 50 or greater, such as about 100 or greater, for example about 150 or greater. In particular, as the constriction becomes more significant, the benefit of using a thickener according to the second aspect becomes even greater. However, preferably the ratio of X to Y is about 2000 or less, such as 1000 or less, such as about 500 or less, for example about 350 or less. This is so that an excessive pressure is not required to force liquids to flow through the beverage dispenser. Thus, a preferred range of the ratio of X to Y is about 20 to about 2000, for example about 50 to about 500, more preferably 150 to 350, such as about 250.

The second aspect may also be expressed in terms of the actual cross-section area constriction. Thus, the inventors have found that, if other thickeners are used in beverage systems having an aperture in the flow path of cross-sectional area of about 2 $mm^2$ or less, gel pieces may become stuck in the aperture and/or a greater pressure may be required to force liquid through the aperture. However, the thickeners of this second aspect facilitate the use of such an aperture.

Accordingly, the second aspect may provide a beverage dispensing system comprising:
a cartridge of beverage concentrate,
an outlet downstream of the cartridge of beverage concentrate for the discharge of a beverage,
a flow path connecting the cartridge of beverage concentrate to the outlet, and
a means for mixing the beverage concentrate with an aqueous medium to form the beverage, the means for mixing being either integrated into the cartridge of beverage concentrate or contained in the flow path,
wherein the flow path comprises an aperture having a cross-sectional area of 2 $mm^2$ or less, and wherein the beverage concentrate is a non-gelled beverage liquid concentrate or a beverage concentrate comprising an alginate and/or a thermally reversible gelling thickener.

Preferably, the aperture has a cross-sectional area (X) of about 1 $mm^2$ or less, for example about 0.5 $mm^2$ or less. In particular, as the aperture becomes smaller, the benefit of using a thickener according to the second aspect becomes even greater. However, preferably the aperture has a cross-sectional area of about 0.05 $mm^2$ or greater so that an excessive pressure is not required to force liquids to flow through the beverage dispenser. For example, the aperture may have a cross-sectional area of about 0.1 $mm^2$ or greater, such as about 0.2 $mm^2$ or greater. Thus a preferred range of minimum cross-sectional areas is about 0.05 $mm^2$ to about 2 $mm^2$, such as about 0.1 $mm^2$ to about 0.5 $mm^2$.

For example the aperture may have a cross-sectional area of 0.36 $mm^2$ (e.g. a square aperture with sides of 0.6 mm); the aperture may also have a cross-sectional area of 0.24 36 $mm^2$ (e.g. a rectangular aperture with sides of 0.6 mm and 0.4 mm). For example, such an aperture may be a foaming means, such as eductor. It will be understood that the aperture may take other shapes other than square and rectangular.

Preferably, the maximum cross-section area (Y) of the flow path is 1000 $mm^2$ or less, such as 500 $mm^2$ or less, such as 200 $mm^2$ or less, more preferably 100 $mm^2$ or less. For example, the flow path may have a maximum cross section of 87.8 $mm^2$. However, the flow path may have a maximum cross-section area (Y) of 5 $mm^2$ or more, such as 10 $mm^2$ or more, preferably 20 $mm^2$ or more, for example 50 $mm^2$ or more. Within these limits, the inventors have found it convenient to work a beverage preparation system, for example facilitating the transport of liquids through the beverage preparation system. For example the maximum cross-section area (Y) may be 5 to 1000 $mm^2$, such as 10 to 500 $mm^2$.

The aperture or constriction may be a foaming means, such as an eductor, to provide optional foaming of a beverage dispensed from the beverage dispenser. For example, the foaming means, such as the eductor, may be provided in a cartridge (e.g. within the flow path of the cartridge) for a beverage dispenser as described herein, for example downstream of a chamber containing (pre-brewing/pre-dilution) the beverage concentrate.

For example, the second aspect of the invention may provide a beverage dispensing system comprising:
a cartridge of beverage concentrate,
an outlet downstream of the cartridge of beverage concentrate for the discharge of a beverage,
a flow path connecting the cartridge of beverage concentrate to the outlet, and
a means for mixing the beverage concentrate with an aqueous medium to form the beverage, the means for mixing being either integrated into the cartridge of beverage concentrate or contained in the flow path,
wherein the flow path comprises an eductor, and wherein the beverage concentrate is a non-gelled beverage liquid concentrate or a beverage concentrate comprising an alginate and/or a thermally reversible gelling thickener.

The second aspect of the invention also extends to a method of dispensing a beverage from a beverage system,
wherein the beverage system contains a cartridge, the cartridge comprising one or more chambers containing a non-gelled beverage liquid concentrate comprising a thickener, and the chamber is connected to an outlet of the beverage system by a flow path, the method comprising the steps of:
mixing the beverage concentrate with an aqueous medium, either in the chamber(s) of the cartridge or in the flow path of the beverage system connecting the chamber(s) to the outlet;
passing the mixture of beverage concentrate and the aqueous medium through an aperture or constriction (such as an eductor) as previously defined, and
dispensing the beverage into a receptacle,
wherein the overall weight ratio of the beverage concentrate to the aqueous medium introduced into the cartridge is about 10:1 to about 1:10.

The method may comprise the additional step of providing or adding a liquid containing calcium, for example a milk-based liquid to the receptacle and/or mixing it with the mixture of beverage concentrate and the aqueous medium within the beverage preparation system. The method may also comprise heating the mixture of beverage concentrate and the aqueous medium to a temperature of from 50° C. to about 100° C., for example from about 70° C. to about 95° C., such as about 85° C. after it has passed through the constriction. This may be achieved, for example, either in the beverage dispenser itself or in the receptacle, for example by adding the mixture of beverage concentrate and the aqueous medium to a heated fluid, such as milk.

The inventors have further investigated combinations of thickeners that provide advantageous mouthfeel to a beverage prepared from a beverage concentrate. Of all the thickeners tested, alone and in combination, the inventors have found that a combination of methyl cellulose and an alginate provide a mouthfeel that is surprisingly advantageous to the consumer.

Accordingly, the present invention provides in a third aspect a beverage concentrate comprising a thickener, wherein the thickener comprises methyl cellulose and at least one alginate in a weight ratio of 1:5 to 5:1, wherein the methyl cellulose and the at least one alginate are present in a combined amount of about 0.01 to about 5 weight %.

The preferred features of the beverage concentrate (for example, the weight % of the alginate, preferred additional ingredients and the inclusion of a calcium ion sequesterant) of this third aspect are the same as those of the liquid beverage concentrate of the first aspect. It should be noted that, while the beverage concentrate of the third aspect may be a liquid concentrate as defined in the first aspect, it may also be a solid concentrate.

EXAMPLES

Example 1

The following working example demonstrates the benefits of this invention in an on-demand beverage prepared with two capsules: one capsule containing 21.5 g of milk brewed with 50 mL of hot water at 94° C. and one capsule containing 20 g of concentrated liquid base recipe brewed with 50 mL of hot water at 94° C. to create a final 100-150 mL beverage.

Reference concentrated liquid base recipe, comprising:
~63% of Iso-glucose
~30% of water,
~5.% of 100% soluble coffee
~1.2% of flavours Example 1

The inventive liquid beverage concentrate was prepared by the addition of Sodium Alginate and Methyl Cellulose into the above described recipe. The inventive concentrated liquid concentrate was prepared by pre-blending 0.25% of commercial Alginate, which consists of mixtures of Sodium Alginate and di-sodium phosphate; 0.25% of commercial Methyl cellulose; 0.20% of tri-sodium citrate with 2.02% of extra fine sugar in a separate vessel to have a homogenous blend to help their dispersion and dissolution. Water was supplied to a vacuum mixer. Once the pressure in the mixer reached −160 mPa, the blend was fed under vacuum into the mixer through a pipe. Mixing at this pressure prevents the incorporation of air in the mix, otherwise it would form a mousse. Agitation and recirculation were programmed to help gum dissolution and avoid lump formation. The pressure was then increased to −500 mPa before the Iso Glucose was added. Soluble coffee was then fed into the vacuum mixer at the same pressure, agitation and recirculation conditions. Recirculation and vacuum were then stopped before the addition of the flavours. A final mixing with all the ingredients, at −500 mPa with agitation and recirculation was conducted before sending the product to the next process step. To control the quality of the mixing, viscosity was measured with a Brookefield DVII viscometer at 20° C. with spindle S3, at a speed of 100 rpm and Torque between 30-70%.

On drinking, after brewing, the overall beverage was thicker and smoother in texture with creamier mouthfeel and offered enhanced organoleptic properties in the inventive liquid beverage concentrate compared to the reference concentrated liquid base recipe.

The flavour variability between four different samples was evaluated using DOD (Degree of Difference methodology in which the DOD from the reference is rated on a scale of 1-11, where 1 is the same as control and 11 is very different to control. The different samples contained:
1. a mixture of sodium alginate (0.25%) and methyl cellulose (0.25%) (control, inventive recipe as described in example 1)
2. no thickeners;
3. methyl cellulose only (0.25%); and
4. sodium alginate only (0.25%).

The DOD test was conducted including a blind control and a random presentation of samples. The blind control was the mix of 2 thickeners. The test was conducted with 5 trained panelists and 2 repetitions. The calculations of the significance level are made on the average of 10 measures with a Two-way ANOVA with replication and Dunnett test at 10% risk level.

Figure 2:
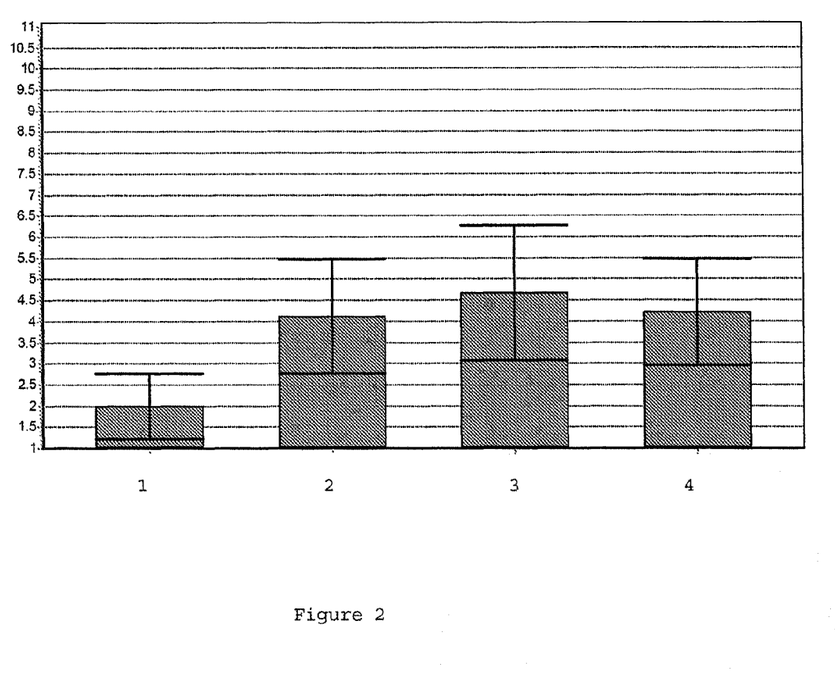
FIG. 2 shows the results of trials investigating the mouthfeel of a particular combination of thickeners.

The results of the DOD test are shown in FIG. 2 and in Table 1:

TABLE 1

| Sample | 1 | 2 | 3 | 4 |
|---|---|---|---|---|
| Mouthfeel | −0.11 | −0.78 | −1.22 | −0.56 |
| Creaminess | 0 | −0.89 | −0.89 | 0.22 |
| Thickness | 0.22 | −1 | −1.44 | −0.44 |
| Mouthcoating | 0.11 | −0.44 | −0.78 | −0.56 |
| Coast Throat | 0 | −0.44 | −0.78 | 0 |
| Overall DOD | 2 | 4.11 | 4.67 | 4.22 |

The results show that:
the sample without thickeners is perceived as being significantly different in overall DOD and it is directionally less thick, coats less mouth and throat;
the sample with methyl cellulose only is significantly different with significantly less thickness and less mouthcoating than the reference sample containing the combination of the two thickeners; and the sample with alginate only is perceived as being significantly different in overall DOD and it is directionally less thick, less mouthcoating, slightly more creamy in texture than the reference sample containing the combination of the two thickeners.

Example 2

The following examples demonstrate how thickeners may be used so as to allow efficient mixing of a beverage concentrate with an aqueous medium within a cartridge. The examples also show how certain thickeners may cause difficulties in using a concentrate comprising a thickener and a constriction in the flow path to the outlet of the beverage system.

A cartridge of about 50 ml volume was provided. It was attempted to be filled with the beverage liquid concentrates as described in example 1 containing the following thickeners:

1.1 Xathan gum (from CP Kelco) 0.05-0.2% weight total beverage
1.2 low-methoxyl pectin (from CP Kelco) 0.05-0.5%
1.3 kappa-carrageenan gum (from CP Kelco) 0.05-0.35%
1.4 iota carrageenan (from CP Kelco) 0.05-0.35%
1.5 lambda carrageenan (from CP Kelco) 0.05-0.6%
1.6 sodium alginate (from Grinstead) 0.045-0.5%
1.7 methyl cellulose (from Dow) 0.045-0.25%
1.8 hydroxy propylmethyl cellulose (from Dow) 0.1-0.5%

Xathan gum was found to considerably thicken the concentrate, making it difficult to fill the beverage cartridge and causing high capsule residues. Further, it was found that it became difficult to force the brewed beverage through an eductor provided at the outlet of the capsule.

Low methoxyl pectin was found to form a gel, making it difficult to fill the beverage cartridge and causing a slow brewing process. Further, it was found that it became difficult to force the brewed beverage through an eductor provided at the outlet of the capsule.

Kappa-Carrageenan and iota-Carrageenan were found to considerably thicken the concentrate, making it difficult to fill the beverage cartridge and causing a slow brewing process. Further, it was found that it became difficult to force the brewed beverage through an eductor provided at the outlet of the capsule.

Lambda Carrageenan was found not to gel; however, it was found not to give the same texture to a beverage as either an alginate or methyl cellulose, either alone or in combination.

Sodium alginate, methyl cellulose and hydroxy propylmethyl cellulose could be successfully loaded into and brewed in the cartridge.

What is claimed is:

1. A sealed cartridge for a beverage preparation system for producing a brewed beverage, the sealed cartridge comprising:
    an inlet for the introduction of an aqueous medium into the cartridge,
    an outlet downstream of the inlet for the discharge of the brewed beverage from the cartridge,
    a flow path connecting the inlet to the outlet, the flow path comprising a first cross-sectional area greater than a second cross-sectional area downstream of the first cross-sectional area,
    a beverage liquid concentrate in the flow path upstream from the second cross-sectional area, the beverage liquid concentrate comprising a liquid concentrate and an alginate and/or a thermally reversible gelling thickener, and the total concentration of the thickener in the beverage liquid concentrate is about 0.01 to about 5 weight %, and
    the one or more thickeners configured to provide delayed thickening so that the beverage liquid concentrate is non-gelled when in the sealed cartridge but capable of flowing through the second cross-sectional area and thickening the brewed beverage after introduction of the aqueous medium into the cartridge.

2. The sealed cartridge of claim 1, wherein the reversible gelling thickener is selected from one or more of methyl cellulose and hydroxy propylmethyl cellulose.

3. The sealed cartridge of claim 1, wherein the alginate is selected from one or more of sodium alginate, potassium alginate, and ammonium alginate.

4. The sealed cartridge of claim 1, wherein the beverage liquid concentrate comprises an alginate and methyl cellulose in a weight ratio of about 1:5 to about 5:1, wherein the methyl cellulose and the at least one alginate are present in a combined amount of about 0.01 to about 5 weight %.

5. The sealed cartridge of claim 1 further comprising:
    a chamber including the beverage liquid concentrate, and the chamber has a cross-sectional area, and
    an aperture having a cross-sectional area of 2 mm$^2$ or less and less than the cross-sectional area of the chamber downstream of the chamber.

6. The sealed cartridge of claim 1, wherein the liquid concentrate comprises a coffee extract.

7. The sealed cartridge of claim 1, wherein the beverage liquid concentrate comprises an alginate and further comprises a calcium ion sequesterant.

8. The sealed cartridge of claim 1, wherein the thickeners in the beverage liquid concentrate are hydrated in a liquid ingredient.

9. The sealed cartridge of claim 1, wherein the first cross-sectional area is 5 mm$^2$ to 1000 mm$^2$ and the second cross-sectional area is 0.05 mm$^2$ to 2 mm$^2$.

10. The sealed cartridge of claim 1, wherein the first cross-sectional area is 10 mm$^2$ to 500 mm$^2$ and the second cross-sectional area is 0.1 mm$^2$ to 0.5 mm$^2$.

11. The sealed cartridge of claim 1, wherein the first cross-sectional area comprises a chamber including the beverage liquid concentrate and the second cross-sectional area comprises an aperture downstream from the chamber.

12. The sealed cartridge of claim 6, wherein the coffee extract comprises soluble coffee.

13. The sealed cartridge of claim 8, wherein the thickeners in the beverage liquid concentrate are hydrated in the liquid ingredient using a hydration technique comprising at least one of sugar hydration and high shear mixing.

14. A sealed cartridge for a beverage preparation system for producing a brewed beverage, the sealed cartridge comprising:
    an inlet for the introduction of an aqueous medium into the cartridge,
    an outlet downstream of the inlet for the discharge of the brewed beverage from the cartridge,
    a flow path connecting the inlet to the outlet,
    a chamber comprising a beverage liquid concentrate in fluid communication with the inlet and outlet, the beverage liquid concentrate comprising a liquid concentrate and an alginate and/or a thermally reversible gelling thickener, and the total concentration of the thickener in the concentrate is about 0.01 to about 5 weight %,
    an aperture downstream from the chamber and having a cross-sectional area less than a cross-sectional area of the chamber,
    the one or more thickeners configured to provide delayed thickening so that the beverage liquid concentrate is non-gelled when in the chamber but capable of flowing through the aperture and thickening the brewed beverage after introduction of the aqueous medium into the cartridge.

15. The sealed cartridge of claim 14, wherein the chamber's cross-sectional area is 5 mm² or more and the aperture's cross-sectional area is 2 mm² or less.

16. The sealed cartridge of claim 14, wherein the chamber's cross-sectional area is 5 mm² to 1000 mm² and the aperture's cross-sectional area is 0.05 mm² to 2 mm².

* * * * *